(12) United States Patent
Palamara et al.

(10) Patent No.: US 8,414,666 B2
(45) Date of Patent: Apr. 9, 2013

(54) INTEGRATED HYDROGEN PRODUCTION AND HYDROCARBON EXTRACTION

(75) Inventors: John Eugene Palamara, Macungie, PA (US); David Anthony Zagnoli, Macungie, PA (US); William Frederick Baade, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/547,329

(22) Filed: Jul. 12, 2012

(65) Prior Publication Data

US 2012/0294783 A1    Nov. 22, 2012

Related U.S. Application Data

(62) Division of application No. 12/642,249, filed on Dec. 18, 2009, now Pat. No. 8,240,370.

(51) Int. Cl.
    *B01J 7/00*    (2006.01)

(52) U.S. Cl. ......... 48/61; 48/127.9; 48/127.1; 48/198.7; 48/198.3; 48/197 R; 422/625; 252/373; 423/650; 423/652; 165/145; 165/157; 165/278; 165/282

(58) Field of Classification Search .............. 48/127.9, 48/127.1, 61, 198.7, 198.3, 197 R; 422/625; 252/373; 423/650, 652
See application file for complete search history.

(56) References Cited

U.S. PATENT DOCUMENTS

| | | | |
|---|---|---|---|
| 3,412,714 A | | 11/1968 | Michel |
| 4,072,625 A | * | 2/1978 | Pinto .......................... 48/198.3 |
| 4,133,384 A | | 1/1979 | Allen et al. |
| 4,473,490 A | * | 9/1984 | Stewart ......................... 48/127.9 |
| 4,576,043 A | | 3/1986 | Nguyen |
| 4,759,314 A | | 7/1988 | Banweg et al. |
| 4,959,079 A | * | 9/1990 | Grotz et al. .................. 48/198.7 |

(Continued)

FOREIGN PATENT DOCUMENTS

| CA | 2610338 | 5/2008 |
|---|---|---|
| CA | 2609859 | 5/2009 |

(Continued)

OTHER PUBLICATIONS

Baumeister, Marks' Mechanical Engineers' Handbook, 6th Ed., McGraw-Hill Book Co., pp. 9.46-9.51, 6.124-6.129 and 16.27.

(Continued)

*Primary Examiner* — Kaity V. Handal
(74) *Attorney, Agent, or Firm* — Bryan C. Hoke, Jr.

(57) ABSTRACT

Reformer and method for producing hydrogen and steam where steam is used for steam-assisted extraction of heavy hydrocarbons. Steam is injected into a hydrocarbon-containing reservoir. Hydrocarbons are extracted from the reservoir along with produced water. Hydrogen is produced in a catalytic steam hydrocarbon reformer. Combustion product gas from the reformer is used to generate wet steam in a once-through steam generator from produced water recycled from the reservoir. The wet steam is used for the steam-assisted extraction of heavy hydrocarbons. The reformer has a heat exchanger section including a first heat exchanger and a second heat exchanger downstream of the first heat exchanger. The second heat exchanger is suitable for processing the produced water by once-through steam generation and is suitable for mechanical cleaning. The reformer also has a first exhaust downstream of the second heat exchanger and a closeable second exhaust downstream of the first heat exchanger.

1 Claim, 2 Drawing Sheets

U.S. PATENT DOCUMENTS

| | | | |
|---|---|---|---|
| 4,987,862 A | 1/1991 | Wittchow et al. | |
| 5,214,956 A | 6/1993 | Chien | |
| 6,019,070 A | 2/2000 | Duffy | |
| 6,109,020 A | 8/2000 | Liebig | |
| 6,250,258 B1 | 6/2001 | Liebig | |
| 6,489,370 B2* | 12/2002 | Iijima et al. | 518/700 |
| 6,531,516 B2 | 3/2003 | Davis et al. | |
| 6,988,549 B1 | 1/2006 | Babcock | |
| 7,341,102 B2 | 3/2008 | Kresnyak et al. | |
| 7,464,756 B2 | 12/2008 | Gates et al. | |
| 7,481,275 B2 | 1/2009 | Olsvik et al. | |
| 7,504,048 B2* | 3/2009 | Licht | 252/373 |
| 7,707,837 B2* | 5/2010 | Inui et al. | 60/780 |
| 7,810,565 B2 | 10/2010 | Zubrin et al. | |
| 7,901,662 B2* | 3/2011 | Marshall et al. | 423/650 |
| 7,988,948 B2* | 8/2011 | Guvelioglu et al. | 423/652 |
| 2002/0025987 A1* | 2/2002 | Iijima et al. | 518/704 |
| 2003/0110694 A1* | 6/2003 | Drnevich et al. | 48/198.5 |
| 2004/0013586 A1* | 1/2004 | Oh et al. | 422/190 |
| 2006/0042794 A1 | 3/2006 | Pfefferle | |
| 2006/0231455 A1 | 10/2006 | Olsvik et al. | |
| 2007/0095536 A1 | 5/2007 | Vinegar et al. | |
| 2007/0104641 A1* | 5/2007 | Ahmed et al. | 423/652 |
| 2008/0289820 A1 | 11/2008 | De Francesco | |
| 2008/0289821 A1 | 11/2008 | Betzer Tsilevich | |
| 2008/0289822 A1 | 11/2008 | Betzer Tsilevich | |
| 2009/0084707 A1 | 4/2009 | Gil | |
| 2009/0100754 A1 | 4/2009 | Gil | |
| 2009/0159498 A1 | 6/2009 | Chinn et al. | |
| 2009/0194280 A1 | 8/2009 | Gil et al. | |
| 2009/0230359 A1* | 9/2009 | Guvelioglu et al. | 252/373 |

FOREIGN PATENT DOCUMENTS

| | | |
|---|---|---|
| GB | 1398078 | 6/1975 |
| WO | 02077124 | 10/2002 |
| WO | 2006113982 | 11/2006 |
| WO | 2007050445 | 5/2007 |
| WO | 2008097666 | 8/2008 |
| WO | 2009009333 | 1/2009 |
| WO | 2009064560 | 5/2009 |
| WO | 2009076763 A1 | 6/2009 |
| WO | 2008077233 A1 | 7/2009 |
| WO | 2009105309 A1 | 8/2009 |

OTHER PUBLICATIONS

Jones, et al., Firebag Cogeneration Project, PMI Global Congress North America 2007, Oct. 6-9, 2007.

Peltier, Port Arthur II Integrated Hydrogen/Cogeneration Facility, Port Arthur, Texas, Power, Sep. 2007, pp. 38-42.

Szyszkowski, Application of Heavy Duty F-Class Gas Turbine for Cogeneration MacKay River Cogeneration Plant, presented at the 16th Symposium on Industrial Application of Gas Turbines (IAGT), Banff, Alberta, Canada, Oct. 12-14, 2005.

* cited by examiner

INTEGRATED HYDROGEN PRODUCTION AND HYDROCARBON EXTRACTION

CROSS-REFERENCE TO RELATED APPLICATIONS

This application is a divisional application and claims the benefit of priority under 35 USC 120 of U.S. application Ser. No. 12/642,249, filed Dec. 18, 2009, the contents of which are hereby incorporated by reference.

BACKGROUND

Oil sand deposits, located in many regions of the world, comprise mixtures of sand, water, clay, minerals, and crude bitumen that can be extracted and processed for fuel. The oil sands of Alberta, Canada, contain some of the largest deposits of hydrocarbons in the world.

Bitumen is classified as an "extra heavy oil," referring to its gravity as measure in degrees on the American Petroleum Institute (API) scale. Bitumen has an API gravity of about 10° or less. The bitumen mined from the Athabasca oil sands of Alberta has an API gravity of about 8°. "Heavy oil" has an API gravity in the range of about 22.3° to about 10°. Heavy oil or bitumen extracted from oil sand is processed or upgraded to produce light synthetic crude oil having an API gravity of about 31° to about 33°. The terms heavy oil and bitumen are used interchangeably herein since they may be extracted using the same processes.

Bitumen can be recovered from the oil sands by various methods, the most common of which include surface or strip mining and in-situ bitumen recovery methods, including thermal in-situ recovery methods. The operations for recovery and extraction of bitumen are highly water intensive, thus facilities must generally draw from a dedicated water source, such as a nearby river or lake. The waste, including water waste, produced during these operations, is disposed of in tailings ponds, sludge lagoons, disposal wells and the like. There is a demand in the industry to reduce water consumption and waste associated with bitumen recovery and extraction processes and to minimize the overall land footprint and environmental impact of these operations.

There may be environmental restrictions placed on heavy oil/bitumen extraction operations that utilize fresh water. These restrictions relate to the amount of fresh water that can be removed from a source in the environment of the operation, such as from a lake, river, or fresh water aquifer. In some instances, the amount of fresh water that can be withdrawn may be a rate-limiting factor in the overall production of the operation. In such an instance, efficient re-use of water can directly impact the production of an operation.

Extracted bitumen may be pumped via pipeline to an upgrader on site or to a refinery for cleaning, treatment and upgrading. Upgrading of bitumen or heavy oil to a light synthetic crude oil is generally accomplished via carbon rejection (i.e. coking) or hydrogen addition. The latter process is typically a two-stage process involving hydrocracking to break down the large hydrocarbon molecules and hydrotreating to stabilize the hydrocarbon compounds and remove impurities. The upgraded synthetic crude oil can be sold to refineries, petrochemical manufacturers or other consumers.

Bitumen extraction operations require expensive and elaborate processing facilities and an abundance of water, as well as energy for heat and steam generation. On average, one and a half to two tons of oil sand must be processed to produce one 159-liter barrel of synthetic crude oil from bitumen. Large quantities of oil sand must be mined and processed each day in order to supply the high demand for synthetic crude oil.

In-situ oil recovery methods, such as thermal in-situ recovery methods, are applied when the bitumen is buried deep within a reservoir and cannot be mined economically due to the depth of the overburden. In-situ production methods may recover between about 25 and 75 percent of the bitumen initially present in a reservoir. In general the focus of an in-situ recovery process is to reduce the viscosity of the bitumen or heavy oil to enable it to flow and be produced from a well.

Thermal in-situ recovery processes use heat, typically provided by steam, to reduce the viscosity of the bitumen in a reservoir and thereby render it more flowable. Examples of thermal in-situ recovery processes include but are not limited to steam-assisted gravity drainage (SAGD), cyclic steam stimulation (CSS), and various derivatives thereof, such as solvent-assisted SAGD (SA-SAGD), steam and gas push (SAGP), combined vapor and steam extraction (SAVEX), expanding solvent SAGD (ES-SAGD), constant steam drainage (CSD), and liquid addition to steam enhancing recovery (LASER), as well as water flooding and steam flooding processes.

In typical gravity-driven thermal in-situ oil recovery processes, two horizontal wells are drilled into the reservoir. A lower horizontal well, ideally located near the bottom of the reservoir, serves as a production well and a horizontal well located above the production well serves as an injection well. Dry or wet steam is injected into the injection well from the surface to heat the bitumen trapped in the reservoir and lower its viscosity. An enormous quantity of steam must be generated for this process and the water used for steam generation in conventional processes must meet boiler feed water specifications. As the viscosity of the bitumen is lowered, it flows into the production well, along with condensed steam, and these liquids are pumped to the surface. A hydrocarbon solvent or other agent may optionally be injected to assist the process.

The hot production fluids, typically comprising about 70% produced water and about 30% bitumen and produced gases, are recovered to the surface via the production well and are separated into their individual components on site. Production fluids from the wellhead are sent to a flow splitter to separate the bitumen, produced water and optionally produced gas into individual streams. A diluent or condensate is added to the bitumen stream to facilitate the removal of residual water from the oil. The diluted bitumen ("dilbit") may be further treated or stored on site before being transported to an upgrader or pipelined to a refinery. The produced gas stream may be used to provide fuel for the steam generators.

The produced water (PW) stream is typically sent to water treatment facilities to make boiler feed water of suitable quality for steam generation. In this process, the PW stream is first deoiled and is then sent for softening treatment. The conventional approach used to treat or soften the produced water to meet boiler feed water specifications is a two-step process involving primary hardness removal followed by secondary hardness removal to polish the water.

This conventional configuration results in numerous waste streams that must be handled and the residual waste is ultimately sent to a disposal well or costly sludge lagoon on site.

There is an economic incentive for improving efficiencies in the bitumen and heavy oil industry in general and, in particular, for reducing capital and operating costs, water consumption, land footprint and the environmental impact associated with bitumen recovery operations. While attempts to reuse and recycle water for improved efficiency within an in-situ recovery operation, or within a mining operation, have been made, advantages to be achieved by integrating an in-situ operation with hydrogen production have not been fully appreciated.

There is a need to generate steam and hydrogen for the steam-assisted extraction of the heavy hydrocarbons from the hydrocarbon-containing reservoir and upgrading of the extracted heavy hydrocarbons.

It is desirable to provide new and improved methods and systems for improving efficiencies in water and energy consumption and also to reduce environmental impact of water consumption and waste disposal associated with bitumen mining and in-situ recovery operations, and reduce capital and operational costs. The reduction of the carbon intensity of bitumen production through efficiency gains or carbon dioxide capture is important for environmental reasons and for maintaining the marketability of bitumen-derived fuels.

There is a need for technologies which capture and re-use water so as to minimize input of fresh water. Industry desires to conserve/minimize the amount of water used for steam injection at hydrocarbon extraction sites.

Sites for heavy hydrocarbon extraction and upgrading of the heavy hydrocarbons are generally remote and co-production of electricity for use in the production facility is sometimes desired as well.

Industry desires improved energy efficiency for the production of steam, hydrogen, and/or electricity.

Industry desires the ability to adjust one or more of the various ratios of steam:hydrogen, steam:electricity produced at a site.

Industry desires uninterrupted supply of hydrogen for upgrading heavy hydrocarbons.

The present invention aims to satisfy one or more of these and other desires of industry.

BRIEF SUMMARY

Generally, the present invention relates to the bitumen and heavy oil industry. The present invention relates to a hydrocarbon processing method and apparatus therefor. More specifically the present invention relates to a method and related reformer for producing hydrogen and steam where the steam is injected into a hydrocarbon-containing reservoir to aid in hydrocarbon extraction.

The method comprises injecting a steam-containing stream through an injection well into a hydrocarbon-containing reservoir; extracting hydrocarbons from the hydrocarbon-containing reservoir and withdrawing the hydrocarbons and recycle water through a production well, the recycle water formed from a portion of the steam-containing stream; introducing a reformer feed gas mixture into a plurality of catalyst-containing reformer tubes of a catalytic steam reformer and reacting the reformer feed gas mixture in a reforming reaction under reaction conditions effective to form a process gas comprising hydrogen; combusting a fuel with an oxidant gas in a combustion section of the reformer external to the plurality of catalyst-containing tubes under conditions effective to combust the fuel to form a combustion product gas and generate heat to supply energy for the reforming reaction; heating a first stream comprising the recycle water and optionally injection make-up water by indirect heat transfer with the combustion product gas thereby producing steam for the steam-containing stream from the first stream, the steam produced at a first pressure between 1 MPa (absolute) to 10 MPa (absolute) or between 2 MPa (absolute) to 6 MPa (absolute) with a first steam quality less than 100% on a mass flow rate basis; conditioning process make-up water in a boiler feed water preparation system to produce boiler feed water from the process make-up water; and heating the boiler feed water by indirect heat transfer with at least one of the process gas and the combustion product gas thereby forming process steam, wherein the reformer feed gas mixture comprises the process steam.

In one or more embodiments, the boiler feed water does not comprise recycle water.

In one or more embodiments, less than 10% on a mass flow rate basis of the steam in the steam-containing stream is from the boiler feed water.

In one or more embodiments, the steam-containing stream is not formed from the boiler feed water.

The process steam may be separated from the boiler feed water in a steam drum.

The first stream may further comprise injection make-up water.

The method may further comprise heating a second stream comprising at least one of injection make-up water and recycle water by indirect heat transfer with the process gas followed by heating the second stream by indirect heat transfer with the combustion product gas mixture thereby producing additional steam for the steam-containing stream from the second stream, the additional steam produced at the first pressure with the first steam quality or a second pressure between 1 MPa (absolute) to 10 MPa (absolute) or between 2 MPa (absolute) to 6 MPa (absolute) with a second steam quality less than 100% on a mass flow rate basis.

The first steam quality may be between 50% and 85% and the second steam quality may be between 50% and 85%.

The process gas may be shifted in one or more shift reactors prior to indirect heat exchange with the second stream.

The method may further comprise removing $CO_2$ from the process gas wherein the steam-containing stream comprises the removed $CO_2$.

The method may further comprise condensing water in the process gas to form a condensate and a water-depleted process gas; separating the condensate from the water-depleted process gas wherein the boiler feed water comprises the condensate; and separating the water-depleted process gas into a hydrogen product gas and a residual gas wherein the fuel comprises the residual gas.

The method may further comprise withdrawing hydrocarbon gases from the production well wherein the reformer feed gas mixture comprises the hydrocarbon gases and/or the fuel comprises the hydrocarbon gases.

The method may further comprise operating a gas turbine power generator to form electrical power and a gas turbine exhaust wherein the oxidant gas comprises the gas turbine exhaust.

The method may further comprise heating a third stream comprising at least one of the injection make-up water and the recycle water in a heat recovery steam generator thereby producing even more additional steam for the steam-containing stream from the third stream, the even more additional steam produced at a third pressure between 1 MPa (absolute) to 10 MPa (absolute) or between 2 MPa (absolute) to 6 MPa (absolute) and a third steam quality less than 100% on a mass flow rate basis, wherein a combustion oxidant for the heat recovery steam generator comprises the gas turbine exhaust. The third steam quality may be between 50% and 85%.

The method may further comprise exhausting the combustion product gas from the reformer at a location upstream of a heat exchanger that provides the indirect heat transfer between the first stream and the combustion product gas, thereby discontinuing heating of the first stream; and cleaning the heat exchanger while continuing to form the process gas comprising hydrogen.

The reformer comprises a combustion section for performing a combustion reaction; a plurality of catalyst-containing tubes for performing a reforming reaction, the plurality of catalyst-containing tubes located within the combustion section; and a heat exchanger section downstream of the combustion section for receiving combustion product gases from the combustion reaction. The heat exchanger section comprises a first heat exchanger for transferring heat from the combustion product gases to a reformer feed gas mixture; a second heat exchanger downstream of the first heat exchanger with respect to the flow of the combustion product gases for transferring heat from the combustion product gases to recycle water to produce a steam-containing stream from the recycle water, wherein the second heat exchanger is suitable for mechanical cleaning; and a first exhaust downstream of the second heat exchanger with respect to the flow of the combustion product gases for exhausting the combustion product gases from the heat exchanger section.

The heat exchanger section of the reformer may further comprise a closable second exhaust downstream of the first heat exchanger with respect to the flow of the combustion product gases and upstream of the second heat exchanger with respect to the flow of the combustion gases.

DETAILED DESCRIPTION

Figure 1:
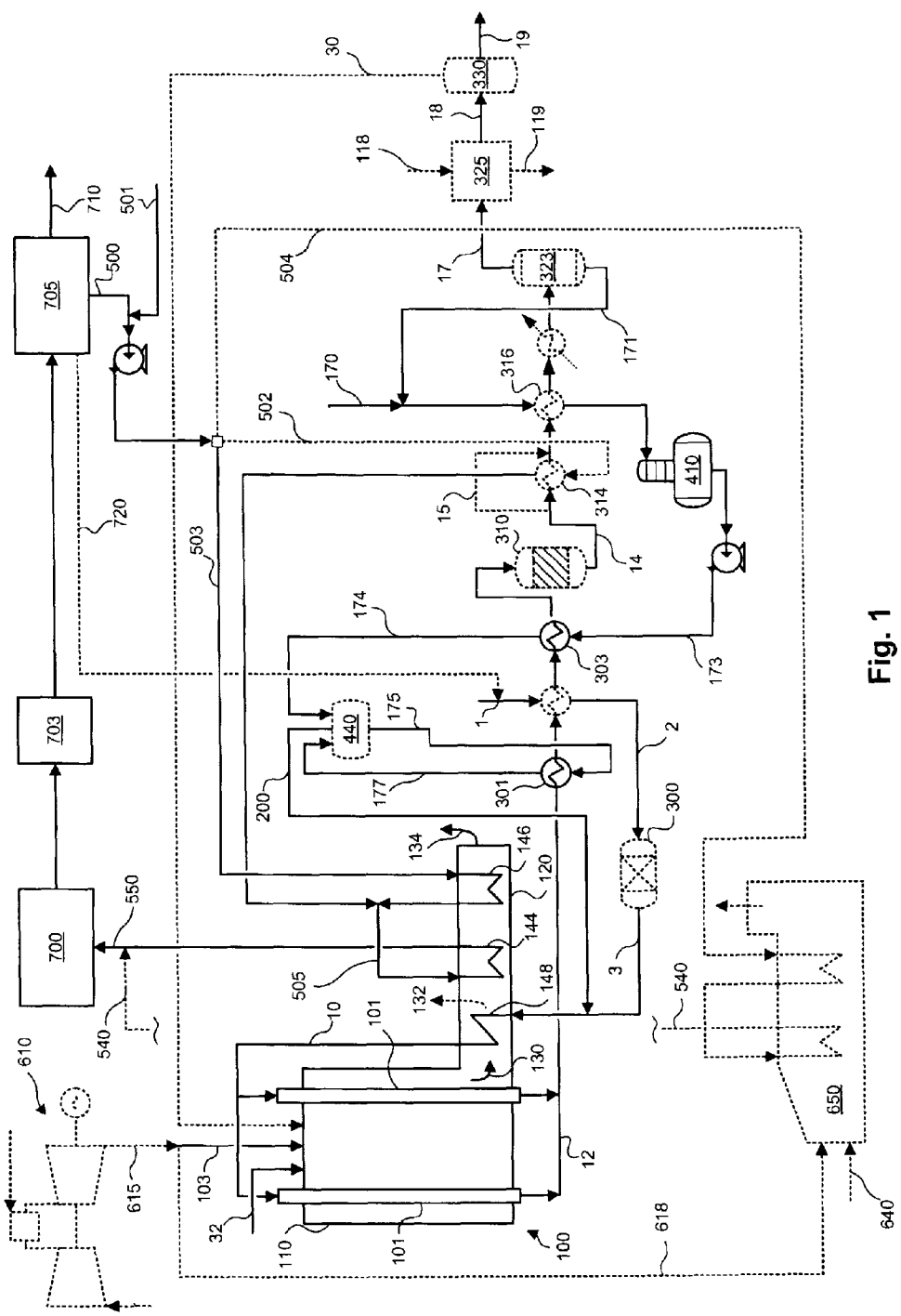
FIG. 1 is a process flow diagram of an integrated system for producing hydrogen and steam.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

As used herein, "plurality" means at least two.

For the purposes of simplicity and clarity, detailed descriptions of well-known devices, circuits, and methods are omitted so as not to obscure the description of the present invention with unnecessary detail.

Illustrative embodiments of the invention are described with reference to the FIG. 1. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The method comprises injecting a steam-containing stream 550 through an injection well 700 into a hydrocarbon-containing reservoir 703 and extracting hydrocarbons 710 from the hydrocarbon-containing reservoir 703. The extracted hydrocarbons may be heavy oil or bitumen, for example from oil-sands reservoirs. The hydrocarbons 710 may be conveyed to a processing facility, for example an upgrader, for upgrading the hydrocarbons by reaction with hydrogen.

The steam-containing steam is generally a wet steam, meaning that it contains liquid water in addition to steam. As is known in the art, the steam-containing stream may also comprise carbon dioxide and/or a heavy hydrocarbon solvent. The addition of a small amount, for example between 0.1 and 15 volume % of heavy hydrocarbon solvent will provide further heavy oil or bitumen mobilization, as the heavy hydrocarbon solvent dissolves into the bitumen, thereby reducing the viscosity of the heavy oil or bitumen such that it flows to a production well. The solvent will also serve to dilute the produced heavy oil or bitumen to help realize the fluid property specifications required for transport by pipeline. Preferably, the solvent is from 1 to 10 volume %, and most preferably between 3 and 8 volume %.

Hydrocarbons 710 and recycle water 500 are withdrawn through a production well 705. Recycle water 500 is formed from a portion of the steam-containing stream 550; a portion of the water and condensed steam from the steam-containing stream 550 is reclaimed as recycle water 500 and another portion of the water and condensed steam is lost to the environment. As defined herein, recycle water is any water that is removed from the production well.

Injecting steam into a hydrocarbon-containing reservoir may be part of a steam flooding operation, steam assisted gravity drainage (SAGD) process or other hydrocarbon extraction process where steam injection is used. Steam flooding is discussed in numerous U.S. Patents including U.S. Pat. No. 4,133,384. Steam assisted gravity drainage (SAGD) is discussed in numerous U.S. Patents including U.S. Pat. No. 6,988,549 and U.S. Pat. No. 4,344,485. Solvent-assisted vapor extraction with steam (SAVES) is discussed in U.S. Pat. No. 7,464,756. Injecting steam into hydrocarbon-containing reservoirs for hydrocarbon extraction is well-known. Procedures, techniques and equipment for injecting steam into hydrocarbon-containing reservoirs are known and available.

The method also comprises introducing a reformer feed gas mixture 10 into a plurality of catalyst-containing reformer tubes 101 of a catalytic steam reformer 100 and reacting the reformer feed gas mixture 10 in a reforming reaction under reaction conditions effective to form a process gas 12 comprising hydrogen. The reaction conditions effective to form the process gas comprising hydrogen include a temperature ranging from 700° C. to 1000° C. and a pressure ranging from 1 to 50 atmospheres. Preferred operating conditions for reforming are known in the art.

Catalytic steam reforming, also called steam methane reforming (SMR) or steam reforming, is defined as any process used to convert reformer feedstock to synthesis gas by reaction of a hydrocarbon and steam over a catalyst. The term "synthesis gas," commonly called syngas, is used herein to mean any mixture comprising hydrogen and carbon monoxide. The reforming reaction is an endothermic reaction and may be described generally as

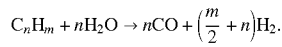

Hydrogen is generated when synthesis gas is generated.

A catalytic steam reformer is a reactor for performing the reforming reaction.

The process gas 12 is often called a reformate. As used herein, a reformate is any mixture comprising hydrogen and carbon monoxide formed from the reforming reaction of a hydrocarbon and steam.

The reformer feed gas mixture comprises methane and steam. The reformer feed gas mixture may also comprise other hydrocarbons, for example, C2 to C6 hydrocarbons and/or naphtha.

The reformer feed gas mixture may have been processed in a preformer (not shown) prior to introducing the reformer feed gas mixture into the plurality of catalyst-containing reformer tubes. A preformer is defined herein as any unfired vessel that converts hydrocarbon feedstock by reaction with steam over a catalyst with or without heating. A preformer may be an adiabatic fixed bed reactor. A preformer may be a tubular reactor. A preformer generally employs a different type of catalyst than a primary reformer, for example a high activity, high nickel content catalyst. Suitable catalysts for preformers are known in the art. Temperatures in a preformer may be in the range of about 400° C. to about 600° C. Heat to a preformer may be provided from exhaust gases from a reformer or other source, but is characterized by the lack of direct heating by a combustion flame. A preformer and a reformer may be physically connected. The preformer may be a so-called convective preformer where the preformer is heated by combustion product gases from the reformer.

The system may also include a convective heat transfer reformer (not shown) as described in U.S. Pat. No. 5,264,202 and/or an oxygen secondary reformer.

As shown in the FIG. 1, the reformer feed gas mixture 10 may be formed by mixing a hydrocarbon feedstock 1 comprising methane with steam 200. The hydrocarbon feedstock may comprise hydrocarbon gases 720 withdrawn from the production well 705. The hydrocarbon feedstock may be heated by heat exchange with the process gas 12 to form the hydrocarbon feedstock 2 which has been heated. Sulfur may be removed from the hydrocarbon feedstock 2 in desulphurization unit 300 to form hydrocarbon feedstock 3 which has been desulphurized.

Reformer furnaces with a plurality of catalyst-containing reformer tubes, i.e. tubular reformers, are well known in the art. Suitable materials and methods of construction are known. Catalyst in the catalyst-containing reformer tubes may be any suitable catalyst known in the art, for example, a supported catalyst comprising nickel.

The method further comprises combusting a fuel 30, 32 with an oxidant gas 103 in a combustion section 110 of the reformer 100 external to the plurality of catalyst-containing tubes 101 under conditions effective to combust the fuel 30, 32 to form a combustion product gas 130 and generate heat to supply energy for the reforming reaction.

Fuel introduced into the combustion section of the reformer may be any fuel suitable for providing heat by combustion in the reformer. The fuel may include pressure swing adsorber residual gas, natural gas, hydrocarbon gases 720 from the reservoir 703, purified methane, propane and the like. Pressure swing adsorber residual gas is any effluent stream from a pressure swing adsorber excluding the hydrogen product stream. Since the articles "a" and "an" as used herein mean one or more when applied to any feature in the specification and the claims, one or more fuels may be introduced into the combustion section of the reformer. It is often the case that multiple fuels are used. A pressure swing adsorber residual gas may be the primary fuel and a supplemental fuel, such as natural gas, added as needed to boost the combustion energy provided for the reforming reaction. The added supplemental fuel is sometimes referred to as "trim fuel."

The combustion section of the reformer is a section wherein combustion occurs. Generally a flame is visible, however flameless combustion may also be used.

The oxidant gas 103 is a gas comprising oxygen. As used herein a "gas" may be a single gas species or a gaseous mixture. The oxidant gas may be air having an oxygen concentration of about 21 volume %. The oxidant gas may be oxygen-enriched air having an oxygen concentration of greater than 21 volume % to 70 volume %. The oxidant gas may be oxygen-depleted air having an oxygen concentration of 13 volume % to less than 21 volume % or 15 volume % to less than 21 volume %, for example exhaust from a gas turbine. At least a portion of the oxidant gas may be introduced into the reformer combustion section through lances. The oxidant gas may be preheated having a temperature of 100 to 600° C. The oxidant gas may be preheated by heat exchange (not shown) between a combustion product gas mixture 130 and/or process gas 12.

At least a portion of the fuel 10 may be premixed with oxidant gas 103 prior to introducing the fuel into the combustion section 110. At least a portion of the fuel may be introduced into the combustion section through fuel lances. To ensure substantially complete combustion of the fuel, a molar ratio of oxygen to fuel is generally provided with a stoichiometry so as to provide about 5 to 10 volume % excess oxygen. Consequently, oxygen is present in the combustion product gas mixture 130.

Fuel and oxidant may be introduced through burners. Burners for use with reformers are available commercially.

Conditions effective to combust the fuel to form a combustion product gas include a furnace temperature in the range of 700° C. to 2500° C. and a pressure in the range of 0.9 to 1.1 atm. In air, the ignition temperature of $CH_4$ is about 700° C. The furnace temperature is a furnace gas temperature in the combustion section of the reformer outside of the flame envelope and may be determined by a suction pyrometer. Suitable conditions include a furnace temperature in the range of 1500° C. to 2500° C. or 1700° C. to 2300° C. and a pressure in the range of 0.9 to 1.1 atm. Preferred combustion conditions in reformers are known in the art.

When the fuel and oxygen are combusted, heat is generated and a combustion product gas 130 is formed. Heat from the combustion process is transferred to the plurality of catalyst-containing reformer tubes 101 thereby supplying energy for the endothermic reforming reaction. The combustion product gas is any gas mixture resulting from at least partial combustion of the fuel and the oxygen and comprises $CO_2$ and $H_2O$. The combustion product gas mixture may comprise $H_2O$, $CO_2$, $N_2$, $O_2$, and generally lesser amounts of CO and unburned hydrocarbons.

The combustion product gas mixture may also comprise NOx or other pollutant gases. NOx reduction techniques known in the art of industrial combustion may be used, for example flue gas recirculation, fuel staging, oxygen staging, selective catalytic or non-catalytic reduction with ammonia, etc.

The combustion product gas may be passed from the combustion section 110 to a heat exchanger section 120 of the reformer where heat may be transferred from the combustion product gas to other streams thereby increasing the efficiency of the overall process. The heat exchanger section 120 is often called the convection section of the reformer. The combustion section of the reformer is also called the radiant section of the reformer due to the radiant heat transfer from the combustion flames to the reformer tubes. There is essentially no radiant heat transfer from the combustion flames in the combustion section to the heat transfer tubes in the heat exchanger section of the reformer.

The method further comprises heating a first stream 503 comprising the recycle water 500 and optionally injection make-up water 501 by indirect heat transfer with the combustion product gas 130 thereby producing steam for the steam-containing stream 550 from the first stream 503. Prior to heating the recycle water 500, the recycle water may be cleaned up, for example filtered, but not nearly so much as typical boiler feed water. The steam produced at a first pressure between 1 MPa (absolute) to 10 MPa (absolute) or between 2 MPa (absolute) to 6 MPa (absolute) with a first steam quality less than 100% on a mass flow rate basis. The first pressure may be selected based upon the reservoir properties and distance between the steam generation site and the reservoir. The first steam quality may be between 50% and 85% on a mass flow rate basis. A mixture of steam and water is often called wet steam. For the purposes of this disclosure, steam quality in the range of 50% to 90% is as measured by the method and device disclosed in U.S. Pat. No. 5,214,956. In carrying out the method, steam quality may be measured by any known means with steam quality correlated to the measurements obtained by the device described in U.S. Pat. No. 5,214,956. Steam quality in the range greater than 90%, is as measured by a throttling calorimeter, for example, see Marks' Mechanical Engineer's Handbook, Sixth Edition, T. Baumeister, Ed., p. 16-27, McGraw-Hill Book Co., 1958. Measuring the steam quality is not required for carrying out the method.

The recycle water 500 and the heavy oil or bitumen are separated and the recycle water contains higher concentrations of suspended and/or dissolved solids and other contaminants than typical boiler feed water.

Generally, not all of the steam/water injected at the injection well will be recovered at the production well 705, so that injection make-up water 501 is added to the recycle water 500. As shown in the FIG. 1, recycle water 500 and optional injection make-up water 501 may be pumped to heat exchangers 144 and 146 in the heat exchanger section 120 of the reformer 100.

With reference to the FIG. 1, the recycle water 500 is heated by indirect heat transfer with the combustion product gas 130 in heat exchangers 144 and 146. Heat exchangers 144 and 146 are operated as once-through steam generators. Once-through steam generation (OTSG) system, also called a once-through heat recovery steam generation (OTHRSG) system are known in the art.

Once-through steam generation systems are used for water which contains high concentrations of suspended and/or dissolved solids. In the prior art, heat is provided in the once-through steam generators by firing a gas or liquid fuel with air or a gas turbine exhaust as the oxidant.

In the present method, heat for the once-through steam generation is provided by the combustion product gas 130 from the combustion section 110 of the reformer. Heat for the once-through steam generation may be provided solely by the heat contained in the combustion product gas. In another alternative, the reformer may be operated fuel-rich and additional oxidant added to combustion product gas for additional combustion and heat. In yet another alternative, the reformer may be operated fuel-lean and additional fuel added to the combustion product gas for additional combustion and heat. In yet another alternative, additional fuel and oxidant may be added to the combustion product gas and combusted in the heat exchanger section. In these alternatives, the heat provided by additional combustion in the heat exchanger section is generally less than 10% of the heat provided in the combustion section.

U.S. Pat. No. 4,759,314 provides some guiding principles for control of once-through steam generators.

As shown in the FIG. 1, the first stream 503 comprising recycle water 500 may be heated by heat exchange with the combustion product gas 130 in heat exchanger 146, combined with another stream and then further heated by the combustion product gas 130 to produce steam in heat exchanger 144. The wet steam produced in heat exchanger 144 may then passed to the injection well 700 as steam-containing stream 550.

As shown in the FIG. 1, the reformer feed gas mixture 10 may also be heated by the combustion product gas 130 in heat exchanger 148. The heat exchanger 148 for heating the reformer feed gas mixture is preferably upstream of the heat exchangers 144, 146 for heating the first stream 503. Under normal operation, the combustion product gas heats the reformer feed gas mixture 10 and the first stream 503 and is exhausted from the heat exchanger section of the reformer through an exhaust or stack downstream of the heat exchangers 144, 146.

A secondary combustion product gas removal system 132 may be located downstream of the heat exchanger 148 for heating the reformer feed gas mixture and upstream of the heat exchangers 144, 146 for heating stream 503. Since the first stream 503 contains suspended and/or dissolved solids, the heat exchangers 144, 146 will require maintenance. When the heat exchangers 144 and 146 require cleaning and/or other maintenance, the combustion product gas 130 is exhausted through the secondary combustion product gas removal system 132. The heating of the first stream 503 is discontinued and the heat exchangers are cleaned or otherwise maintained. This will provide the benefit that the reformer feed gas mixture 10 is still heated as required for the hydrogen production process.

Figure 2:
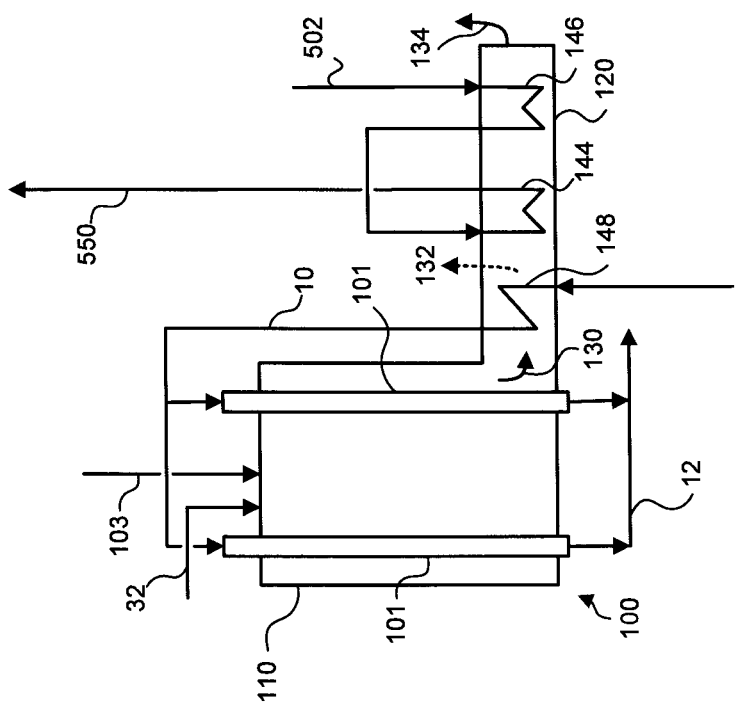
FIG. 2 is a schematic of a reformer.

Accordingly, the present invention also relates to a reformer as shown in FIG. 2. The reformer 100 comprises a combustion section 110 for performing a combustion reaction. Fuel 32 and oxidant gas 103 are introduced into the combustion section 110 through a plurality of burners. Burners for reformers are available commercially. The burners may be fuel-staged and or oxidant-staged burners. One skilled in the art can readily select suitable burners. The reformer also comprises a plurality of catalyst-containing tubes 101 for performing the reforming reaction. The plurality of catalyst-containing tubes 101 are located within the combustion section 110 of the reformer 100. Process gas 12 comprising hydrogen is removed from the catalyst-containing tubes 101. The reformer also comprises a heat exchanger section 120 downstream of the combustion section 110 for receiving combustion product gases from the combustion reaction.

The heat exchanger section comprises a first heat exchanger 148 for transferring heat from the combustion product gases to a reformer feed gas mixture 10. The heat exchanger section also comprises a second heat exchanger 144, 146 downstream of the first heat exchanger with respect to the flow of the combustion product gases. The second heat exchanger is for transferring heat from the combustion product gases to one or more streams comprising recycle water 502 to produce steam-containing stream 550 from recycle water. The second heat exchanger is constructed to be suitable for mechanical cleaning. Mechanical cleaning of such heat exchangers is typically called "pigging."

The heat exchanger section further comprises a first exhaust 134 which is located downstream of the second heat exchanger 144, 146, where "downstream" is with respect to the flow of the combustion product gases. The first exhaust is suitable for exhausting the combustion product gases from the heat exchanger section.

The heat exchanger section may further comprise a closable second exhaust 132 which is located downstream of the first heat exchanger 148, where downstream is with respect to the flow of the combustion product gases. The closable second exhaust 132 is located upstream of the second heat exchanger 144, 146, where upstream is with respect to the flow of the combustion product gases. Under normal operating conditions, closable second exhaust 132 is closed and the combustion product gases exit the heat exchanger section through the first exhaust 134.

When the second heat exchanger 144, 146 requires cleaning and/or other maintenance, closable second exhaust 132 is opened and the combustion product gases are diverted and inhibited from passing in heat transfer relationship with second heat exchanger 144, 146. Closable second exhaust 132 is constructed to be suitable for diverting the combustion product gases. Having a closable second exhaust 132 provides the benefit of allowing continued production of hydrogen when the second heat exchanger 144, 146 is cleaned and/or maintained. It is not important whether the first exhaust 134 is closable or not.

The method comprises conditioning process make-up water 170 in a boiler feed water preparation system 410 to produce boiler feed water 173 from the process make-up water 170. The boiler feed water 173 may also comprise condensate 171 from the process gas 14. Boiler feed water is generally conditioned to make the water suitable for use in packaged boilers. Boiler feed water is generally conditioned for removal of suspended solids, removal of hardness by chemical treatment, removal of hardness by cation exchange, removal of dissolved solids by demineralization, removal of gases by deaeration, and pH treatment. Boiler feed water conditioning is known in the art and is discussed in Marks' Mechanical Engineers' Handbook, Sixth Edition, McGraw-Hill Book Company, 1958, pp. 9-46 through 9-52.

As used herein, "conditioning" water means one or more of removal of suspended solids, removal of hardness, removal of dissolved solids, removal of gases and pH treatment. Conditioning may include all of removal of suspended solids, removal of hardness, removal of dissolved solids and removal of gases.

The method comprises heating the boiler feed water 173, 175 by indirect heat transfer with at least one of the process gas 12 and the combustion product gas 130 thereby forming process steam 200. In the FIG. 1, the boiler feed water 173 is heated by the process gas 12 in heat exchanger 303 and the boiler feed water 174 which has been heated is passed to an optional steam drum 440. Water and steam are separated in steam drums. The process steam 200 is separated from the boiler feed water 175 in steam drum 440. The steam from the steam drum is mixed with a hydrocarbon feedstock 3 to form the reformer feed gas mixture 10. The reformer feed gas mixture 10 comprises the process steam 200. In the FIG. 1, water 175 from the steam drum 440 is heated by the process gas 12 in heat exchanger 301 where a two-phase mixture of steam and water 177 is then returned to the steam drum. Although not shown in the FIG. 1, the water from the steam drum may be additionally or alternatively heated by the combustion product gases 130.

In one or more embodiments, steam for the process steam 200 is formed separately from the steam for the steam-containing stream 550. In one or more embodiments, the boiler feed water 173, 175 does not comprise recycle water 500. Since the boiler feed water is used to form steam for the reformer feed gas mixture 10 and the boiler feed water does not comprise recycle water, the reformer feed gas mixture will not comprise steam formed from recycle water 500.

In one or more embodiments, steam for the steam-containing stream 550 is not formed from the boiler feed water 173, 175. However, in other embodiments, it is possible that a small amount, less than 10% on a mass flow rate basis of the steam in the steam-containing 550 may have originated from the boiler feed water 173, 175.

As shown in the FIG. 1, the method may further comprise heating a second stream 502 comprising at least one of the injection make-up water 501 and the recycle water 500. The second stream 502 is heated by indirect heat transfer with the process gas 14 in heat exchanger 314. The second stream 502 is further heated by indirect heat transfer with the combustion product gas mixture 130 in heat exchanger 144 thereby producing additional steam for the steam-containing stream 550 from the second stream 502. With reference to the FIG. 1, the first stream 503 and the second stream 502 may be combined into stream 505 and heated together in heat exchanger 144 by indirect heat transfer with the combustion product gas mixture 130. As discussed above, heat exchanger 144 is operated as a once-through steam generator and produces wet steam. The additional steam is produced at the first pressure with the first steam quality or a second pressure between 1 MPa (absolute) to 10 MPa (absolute) or between 2 MPa (absolute) to 6 MPa (absolute) with a second steam quality less than 100% on a mass flow rate basis. The second pressure may be selected based upon the reservoir properties and distance between the steam generation site and the reservoir. The second steam quality is different than the first steam quality and may be between 50% and 85% on a mass flow rate basis.

As shown in the FIG. 1, the process gas 12 may be further processed.

After suitable cooling, the process gas 12 may be shifted in one or more shift reactors 310 to form the process gas 14 after shift. With reference to the FIG. 1, the process gas 12 is shifted in shift reactor 310 prior to indirect heat exchange with the second stream 502 in heat exchanger 314. As used herein, the process gas is shifted if a portion or all of the process gas is shifted.

When the process gas 12 is shifted, the method further comprises introducing at least a portion of the stream formed from the reformed gas mixture into a shift reactor. Shift reactors, also called water-gas shift reactors, and their operation are well-known in the art. One or more shift reactors may be employed. Shift reactors comprise a vessel containing a catalyst bed through which CO and $H_2O$ flows to form $H_2$ and $CO_2$. The one or more shift reactors may be high temperature, medium temperature, low temperature and/or isothermal shift reactors. High temperature shift reactors may operate at about 350° C. to 450° C. and typically use a non-noble metal catalyst such as mixture of $Fe_3O_4$ and $Cr_2O_3$ (i.e. about 55 wt % Fe and 6 % Cr). Low temperature shift reactors may operate at about 200° C. to 260° C. and may use a non-noble catalyst such as Cu—ZnO—Al$_2$O$_3$, or Cu—ZnO—Cr$_2$O$_3$. Medium temperature shift reactors operate in the same temperature range as low temperature shift reactors and use a similar catalyst. Low temperature shift reactors are used in combination with high temperature shift reactors, whereas medium temperature shift reactors may be operated without an upstream high temperature shift reactor. Medium temperature shift catalyst is designed to withstand a higher temperature rise through the catalyst bed. Some CO remains after the water-gas shift reaction and there is therefore CO in the effluent of the shift reactor.

Shift reactors and suitable shift catalysts are known in the art. Any suitable shift catalyst may be used. One skilled in the art can readily select a suitable shift catalyst.

A by-pass conduit 15 may included to re-route the flow process gas 14 around heat exchanger 314. Since the second stream 502 contains suspended and/or dissolved solids, heat exchanger 314 will likely require maintenance. When heat exchanger 314 requires cleaning and/or other maintenance, the process gas 14 by-passes heat exchanger 314 via by-pass conduit 15. Process gas 14 continues downstream for further processing while heat exchanger 314 is cleaned or otherwise maintained. This will provide the benefit that the process gas is further processed to produce hydrogen while allowing cleaning of heat exchanger 314.

Heat may be transferred from process gas 14 to process make-up water 170 and condensate 171 in heat exchanger 316. The process gas may be further cooled to condense water contained therein and the condensate 171 separated from water-depleted process gas 17 in water separator 323. Condensate 171 may be combined with process make-up water 170 so that boiler feed water 173 comprises the condensate 171.

The process may further comprise scrubbing the process gas 14 or water-depleted process gas 17 with a wash stream 118 to form a carbon dioxide-depleted process gas 18 and a carbon dioxide-loaded wash stream 119. Scrubbing may be done in a so-called gas scrubber 325. Carbon dioxide scrubbing is also known in the art as acid gas removal. The wash stream 118 may be any scrubbing fluid known in the art, for example N-methyl diethanolamine (aMDEA). Other scrubbing fluids associated with other scrubbing methods, for example, RECTISOL®, SELEXOL®, GENOSORB®, and SULFINOL® are known in the art.

The term "depleted" means having a lesser mole % concentration of the indicated component than the original stream from which it was formed. This means that the carbon dioxide-depleted process gas has a lesser mole % concentration of carbon dioxide than the process gas which was introduced into the scrubber 325. The wash stream, having an affinity for carbon dioxide will become "loaded" with carbon dioxide. Carbon dioxide will become absorbed or otherwise taken in by the wash stream 118.

Water may be removed from the process gas 14 prior to the gas scrubber 325 via water separator 323 and/or in the gas scrubber 325. Additional water may be removed from the carbon dioxide-depleted process gas after the scrubber 325. Water removal is conventional and water may be removed by any suitable water removal device known in the art.

CO$_2$ from the carbon dioxide-loaded wash stream 119 may be sequestered and/or introduced into the steam-containing stream 550.

The process gas 14, the water-depleted process gas 17 and/or the carbon dioxide-depleted process gas 18 may be separated into a hydrogen product gas 19 and a residual gas 30 in separator 330. As discussed above, the fuel 30, 32 may comprise the residual gas 30. The step of separating the various process gases may be done by pressure swing adsorption and/or temperature swing adsorption. Construction and operation of pressure swing adsorbers and temperature swing adsorbers are known in the art. Suitable devices and operating conditions may be selected by one skilled in the art.

Hydrogen product gas 19 may be transferred to a hydrogen pipeline. The hydrogen pipeline may provide hydrogen to a hydrocarbon upgrader where heavy hydrocarbons such as bitumen are upgraded by reaction with hydrogen.

The method may optionally comprise operating a gas turbine power generator 610 to form electrical power and a gas turbine exhaust 615. Gas turbine exhaust is typically at an elevated temperature and contains sufficient oxygen for further combustion. The oxidant gas 103 for the reformer may comprise gas turbine exhaust 615.

In case the optional gas turbine power generator 610 is used, the method may further comprise heating a third stream 504 comprising at least one of the injection make-up water 501 and the recycle water 500 in a heat recovery steam generator 650. The heat recovery steam generator 650 produces even more additional steam 540 for the steam-containing stream 550 from the third stream 504. The steam 540 may be produced at a third pressure between 1 MPa (absolute) to 10 MPa (absolute) or between 2 MPa (absolute) to 6 MPa (absolute) and a third steam quality less than 100% on a mass flow rate basis. The third pressure may be selected based upon the reservoir properties and distance between the steam generation site and the reservoir. Fuel 640 may be introduced into the heat recovery steam generator. Combustion oxidant 618 for the heat recovery steam generator 650 may comprise the gas turbine exhaust 615. The third steam quality may be between 50% and 85%.

Although the present invention has been described as to specific embodiments or examples, it is not limited thereto, but may be changed or modified into any of various other forms without departing from the scope of the invention as defined in the accompanying claims.

We claim:

1. A reformer comprising:
 a plurality of catalyst-containing tubes for receiving a reformer feed gas mixture and reacting the reformer feed gas mixture in a reforming reaction, the plurality of catalyst-containing tubes located within a combustion section of the reformer;
 the combustion section for combusting a fuel with an oxidant gas in a combustion reaction external to the plurality of catalyst-containing tubes; and
 a heat exchanger section downstream of the combustion section for receiving combustion product gases from the combustion reaction, the heat exchanger section comprising:
  a first heat exchanger for transferring heat from the combustion product gases to the reformer feed gas mixture;
  a second heat exchanger downstream of the first heat exchanger with respect to the flow of the combustion product gases for transferring heat from the combustion product gases to recycle water from a production well to produce a steam-containing stream from the recycle water, wherein the second heat exchanger is suitable for mechanical cleaning; and
  a first exhaust downstream of the second heat exchanger with respect to the flow of the combustion product gases for exhausting the combustion product gases from the heat exchanger section wherein the heat exchanger section further comprises a closable second exhaust downstream of the first heat exchanger with respect to the flow of the combustion product gases and upstream of the second heat exchanger with respect to the flow of the combustion gases.

* * * * *